July 14, 1942.                C. F. ROSE                 2,289,521
             STEREOSCOPIC MOTION PICTURE VIEWING DEVICE
                 Filed Aug. 18, 1941          2 Sheets-Sheet 1
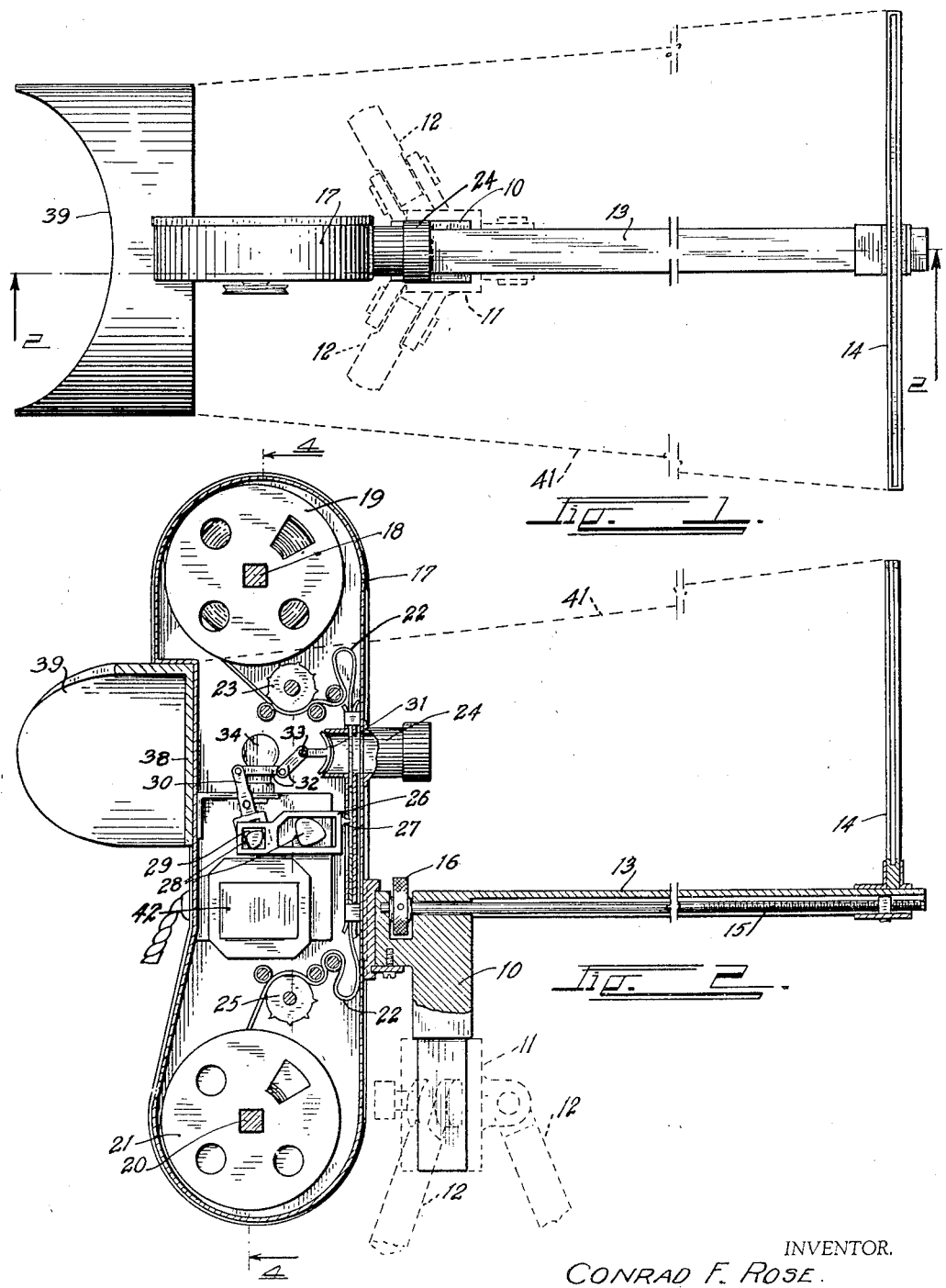
INVENTOR.
CONRAD F. ROSE.
BY
ATTORNEY.

July 14, 1942.     C. F. ROSE     2,289,521
STEREOSCOPIC MOTION PICTURE VIEWING DEVICE
Filed Aug. 18, 1941     2 Sheets-Sheet 2
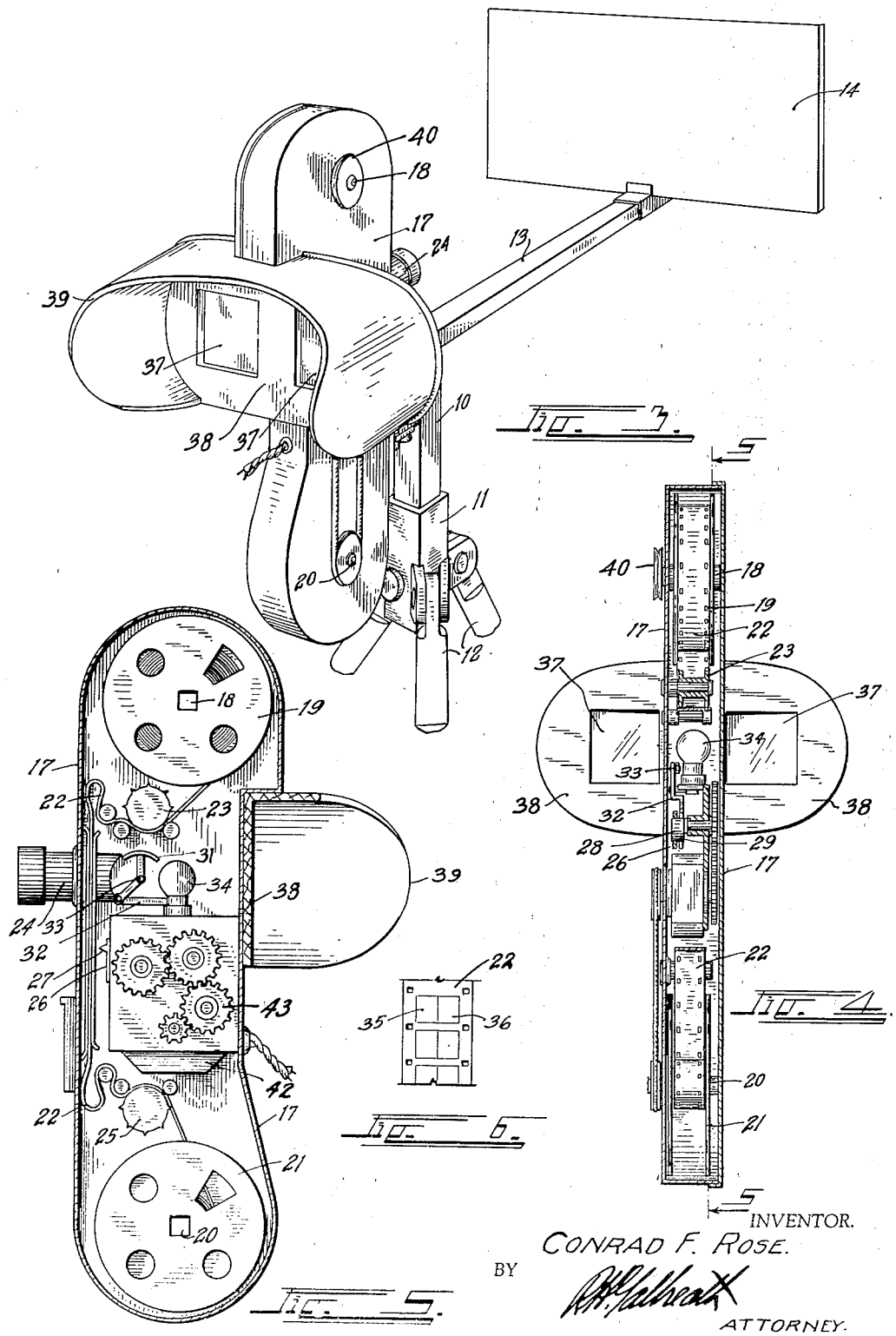
INVENTOR.
CONRAD F. ROSE.
BY
ATTORNEY.

Patented July 14, 1942

2,289,521

UNITED STATES PATENT OFFICE 2,289,521

STEREOSCOPIC MOTION PICTURE VIEWING DEVICE

Conrad F. Rose, Denver, Colo., assignor of forty-nine per cent to Elsie Haas Littlejohn, Helper, Utah Application August 18, 1941, Serial No. 407,269

4 Claims. (Cl. 88—16.6)

This invention relates to a stereoscopic motion picture viewer and has for its principal object the provision of a small, compact stereoscope unit which will impart motion to the pictures being viewed through the stereoscope lenses.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a plan view of the improved motion picture stereoscope;

Fig. 2 is a longitudinal section therethrough, taken on the line 2—2, Fig. 1;

Fig. 3 is a perspective view of the complete device;

Fig. 4 is a vertical section, taken on the line 4—4, Fig. 2;

Fig. 5 is a similar section, taken on the line 5—5, Fig. 4; and

Fig. 6 is a detail view illustrating a portion of the type of film employed in the device.

The improved motion picture stereoscope is supported from a frame member 10, the lower extremity of which is designed to be received in a head 11 provided with suitable tripod legs 12 by means of which the entire device is supported.

An arm 13 extends forwardly from the frame member 10 to support a viewing screen 14. The viewing screen is slidably mounted on the arm 13 and may be moved forward and back thereon for focusing purposes by means of an adjusting screw 15 provided with a knurled finger button 16.

The mechanism for projecting the motion pictures on the viewing screen is enclosed within a relatively flat projector housing 17 which is removably attached to the rear face of the frame member 10. The projector housing contains an unwinding shaft 18, for carrying a film reel 19, and a winding shaft 20 for receiving a second film reel 21. The film, illustrated at 22, unwinds from the reel 19 over an intermittent sprocket 23 thence extends across a projecting lens system 24 and over a second intermittent sprocket 25 to the reel 21, as is usual in the motion picture practice.

The film is drawn downwardly intermittently by means of an oscillating frame 26 carrying film engaging points 27 which engage the edge openings with which such films are provided. An oscillating upward and downward motion is imparted to the frame 26 by means of two cams 28.

A third cam 29, mounted on the shaft of one of the cams 28, oscillates a shutter lever 30 which communicates a reciprocating motion to a light shutter 31 through the medium of suitable linkage 32. The light shutter is pivoted at 33 so that it can swing upward and downward to intercept the light rays passing from a suitable projecting lamp 34 to the lens system 24. The projecting lamp is preferably of the silvered back type to form a self-contained reflector.

The film 22 carries two images 35 and 36 which have been photographed in stereoscopic relation to each other.

It can be readily seen that as the film passes the projecting lens, these two images will be projected side by side on the viewing screen 14. The images are viewed through ordinary stereoscopic lenses 37 which are spaced apart the normal pupilar distance and mounted in a front board 38 of an eye shield 39. The entire projecting mechanism is mounted between the two lenses 37.

The projector may be operated by motor or by hand as desired. As illustrated, it is motor operated, that is, a suitable motor 42 is mounted in the housing 17. The motor is geared by means of suitable transmission gears 43 with the shafts carrying the cams 28.

As illustrated the device must be used in a darkened room. If it is desired to use it in the light, a suitable hood or shield could be provided between the eye shield 39 and the projection screen 14, as indicated in dotted line at 41, Figs. 1 and 2.

The use and operation of the device is believed to be readily apparent. A third dimensional quality is imparted to the moving pictures by viewing the images through the lenses 37 as is usual in stereoscopes. It will be noted that the projection housing is sufficiently narrow to be placed between the two lenses 37 without inconvenience to the user. The projection lens system 24 lies in the plane of the viewer's line of sight to avoid any distortion in the images.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A motion picture stereoscope comprising: a relatively thin, vertically positioned projector housing; a motion picture projection mechanism within said housing; a supporting arm extending forwardly from said housing; a projection screen supported by said arm in the projection path of said projector; and a stereoscopic viewing lens positioned at each side of said housing through which the pictures on said screen may be viewed, said housing being positioned between the viewing lenses and the projection screen.

2. A motion picture stereoscope comprising: a pair of stereoscopic lenses spaced-apart the normal pupilar distance; a viewing screen supported ahead of said lenses; and a motion picture projector mounted between said lenses and intermediate the latter and said screen to project stereoscopically related images on said screen.

3. A motion picture stereoscope comprising: a pair of stereoscopic lenses spaced-apart the normal pupilar distance; a viewing screen supported ahead of said lenses; and a motion picture projector mounted between said lenses and intermediate the latter and said screen to project stereoscopically related images on said screen, the axis of projection of said projector lying in substantially the same plane as the horizontal axis of said lenses.

4. A motion picture stereoscope comprising: a frame member; means for supporting said frame member; a substantially horizontal arm extending forwardly from said frame member; a vertical projection screen supported by and movable along said arm; a projector housing supported by said frame member; a motion picture projection mechanism within said housing; a projection lens system in said projection mechanism positioned in horizontal alignment with said screen and directed toward the latter; a lens board supported across the rear of said projector housing; and a stereoscopic viewing lens carried in said board at each side of said housing, said lens being substantially in horizontal alignment with said projection lens system.

CONRAD F. ROSE.